US011343148B2

(12) United States Patent
Richards et al.

(10) Patent No.: US 11,343,148 B2
(45) Date of Patent: May 24, 2022

(54) SECURE MANAGEMENT OF DEVICES

(71) Applicant: Microsoft Technology Licensing, LLC, Redmond, WA (US)

(72) Inventors: Peter John Richards, Snoqualmie, WA (US); Sean Anderson Bowles, Seattle, WA (US); Haipeng Li, Redmond, WA (US); Peter J. Kaufman, Sammamish, WA (US); Shayak Lahiri, Redmond, WA (US); Brian Stuart Perlman, Bothell, WA (US); Venkata Raghuram Pampana, Redmond, WA (US); Dhruma Kishan Parikh, Redmond, WA (US); Manoj Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 16/813,383

(22) Filed: Mar. 9, 2020

(65) Prior Publication Data

US 2021/0281481 A1    Sep. 9, 2021

(51) Int. Cl.
*H04L 12/24* (2006.01)
*H04L 29/08* (2006.01)
(Continued)

(52) U.S. Cl.
CPC ...... *H04L 41/0843* (2013.01); *H04L 41/0893* (2013.01); *H04L 41/22* (2013.01); *H04L 63/20* (2013.01); *H04L 67/34* (2013.01)

(58) Field of Classification Search
CPC ............. H04L 41/0803; H04L 41/0843; H04L 41/0853; H04L 41/0869; H04L 41/0873;
(Continued)

(56) References Cited

U.S. PATENT DOCUMENTS 7,469,279 B1 * 12/2008 Stamler ............... H04L 41/0672
709/220
2008/0070495 A1 * 3/2008 Stricklen ............... H04L 67/125
455/3.01
(Continued)

FOREIGN PATENT DOCUMENTS

AU        2017223831 A1 *  9/2018  ......... H04L 63/0485
CN          101183978 A   *  5/2008  ......... H04L 41/0886

OTHER PUBLICATIONS

"International Search Report and Written Opinion Issued in PCT Application No. PCT/US21/014258", dated Apr. 6, 2021, 13 Pages.

*Primary Examiner* — Kostas J Katsikis
(74) *Attorney, Agent, or Firm* — Rainier Patents, P.S.

(57) ABSTRACT

This document relates to a process for supporting the management of a variety of types of deployed devices. Administrators utilizing enterprise services can provide generic configuration data using configuration templates, which can be provided to a management server. The management server can then precompute device-specific configuration settings and resolve any conflicts that may arise based on the configuration templates. The configuration templates can also include placeholders for secret values, and once a managed device checks in to the management server, the secret values can be retrieved from an applicable enterprise service and provided to the managed device at the time of applying the configuration template.

20 Claims, 5 Drawing Sheets

(51) Int. Cl.
*H04L 29/06* (2006.01)
*H04L 41/084* (2022.01)
*H04L 41/0893* (2022.01)
*H04L 41/22* (2022.01)
*H04L 67/00* (2022.01)

(58) Field of Classification Search
CPC . H04L 41/0886; H04L 41/0893; H04L 41/22; H04L 63/20; H04L 67/34; H04L 41/08; G06F 9/445; G06F 9/4416
See application file for complete search history.

(56) References Cited

U.S. PATENT DOCUMENTS

| | | |
|---|---|---|
| 2012/0102215 A1 | 4/2012 | Catrein |
| 2013/0007245 A1* | 1/2013 | Malik ................ H04L 41/0893 709/223 |
| 2013/0167223 A1* | 6/2013 | Prerna .................. G06F 21/629 726/18 |
| 2015/0319252 A1* | 11/2015 | Momchilov .......... H04L 67/141 709/223 |
| 2015/0326540 A1 | 11/2015 | Hamburg et al. |
| 2015/0333959 A1* | 11/2015 | Pathak ................ H04L 41/0843 709/220 |
| 2016/0050116 A1 | 2/2016 | Sheshadri et al. |
| 2016/0366233 A1 | 12/2016 | Le et al. |
| 2017/0094509 A1* | 3/2017 | Mistry ............... H04L 63/0823 |
| 2017/0228559 A1* | 8/2017 | Jackson .................. H04L 9/30 |
| 2017/0288883 A1* | 10/2017 | Goverdhan .......... H04L 9/3226 |
| 2020/0065166 A1 | 2/2020 | Myneni et al. |
| 2020/0119983 A1* | 4/2020 | D'Onofrio .......... H04L 41/5054 |

\* cited by examiner

| MICROSOFT | MY TEMPLATES | FEEDBACK | | | | ⚙ HELP |
|---|---|---|---|---|---|---|
| ⚙ Manage | | | | | | |
| 🏠 HOME | GUI 200 | | | | | |
| ≡ DASHBOARD | | | | | | |
| ≡ ALL SERVICES | 👤 DEVICE ADMINISTRATION PAGE | | | | | |
| ≡ DEVICES | NEW DEVICE —202  TEMPLATE VIEW —204 | | | | | |
| ≡ TEMPLATES | SEARCH: —206 | | | | | |
| ≡ APPLICATIONS | 🔍 | | | | | |
| ≡ ENDPOINT SECURITY | FILTER BY USER: —208  FILTER BY GROUP: —210  FILTER BY TYPE: —212 | | | | | |
| ≡ REPORTS | ALL USERS ▾ | ALL GROUPS ▾ | | ALL TYPES ▾ | | |
| | DESCRIPTIONS | | TEMPLATE | STATE | LAST REPORT | |
| | SMARTPHONE DEVICES – ALL | | Phone ▾ | APPLIED | 3/13/19 | |
| | SMARTPHONE DEVICES – JOHN SMITH | | Phone-Smith ▾ | APPLIED | 3/13/19 | |
| | WINDOWS DEVICES | | Windows-Base ▾ | NOT CONFIGURED | 12/11/19 | |
| | ANDROID DEVICES | | Android-Base ▾ | ERROR IN CONFIG. | 02/23/20 | |
| | MACOS DEVICES | | macOS-Base ▾ | APPLIED | 5/23/19 | |
| | LOBBY TERMINAL | | Public ▾ | APPLIED | 1/22/18 | |
| | MARKETING GROUP – ALL | | Marketing ▾ | APPLIED | 3/13/19 | |
| | ↖214 | | | | | |

FIG. 2

SECURE MANAGEMENT OF DEVICES

BACKGROUND

Within organizations throughout the world, a common need for Information Technology (IT) administrators is the convenient ability to manage multiple types of devices and networks across an organization. Typically, an organization may want to enforce certain rules or requirements on devices associated with that organization. However, each device may require unique information in order to work with the organization's network, which can then require the IT administrator to manually configure each device as part of the provisioning process. Furthermore, because the various devices used by the organization may require different configurations, the IT administrator cannot easily rely on configuration templates to set up the devices, resulting in added expense and time in configuring the devices to useable states. As such, there remain difficulties in rapidly provisioning devices in a convenient manner.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 2 illustrates an example graphical user interface that is consistent with some implementations of the present concepts.

DETAILED DESCRIPTION

Overview

Figure 1:
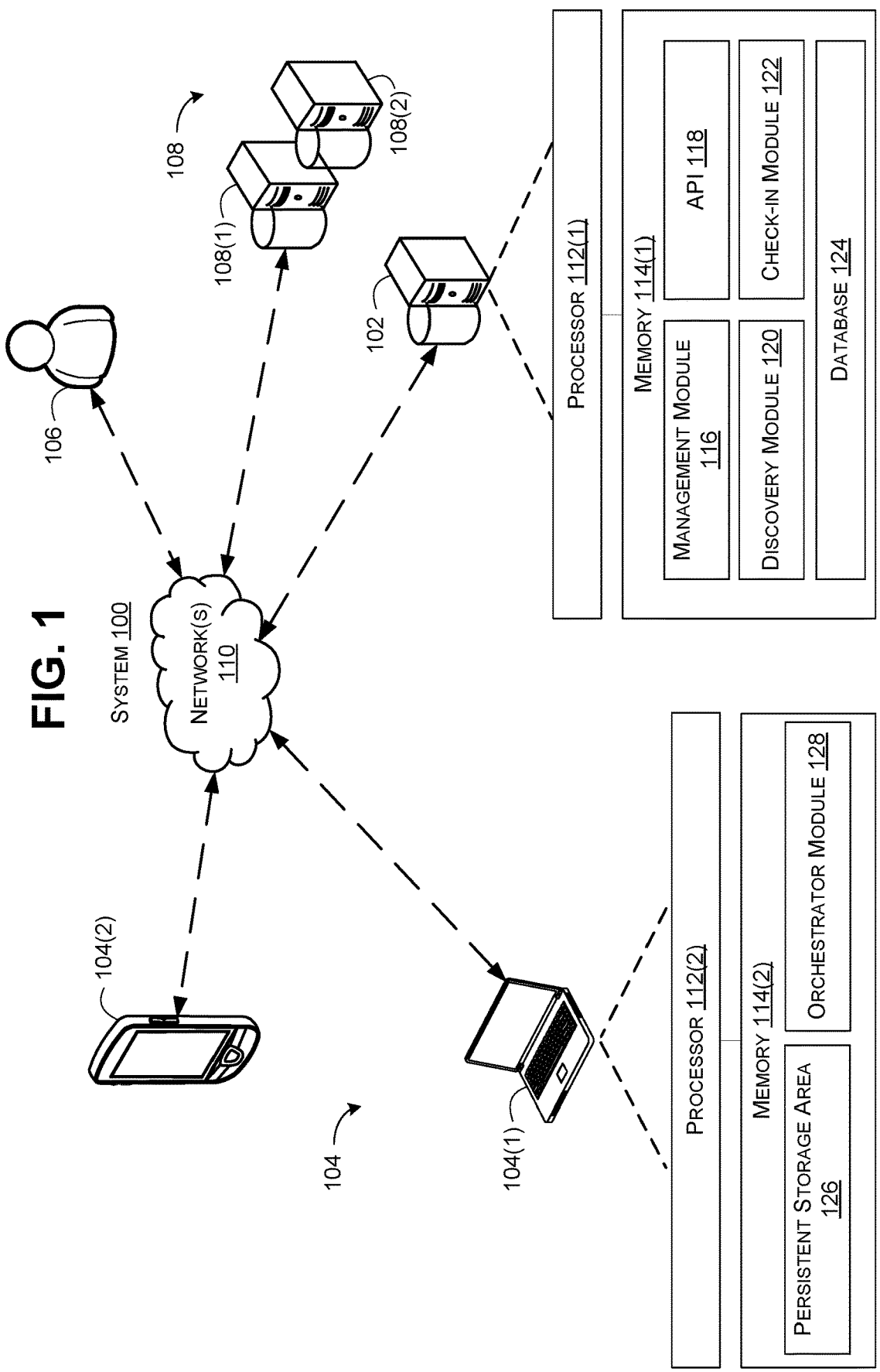
FIG. 1 illustrates an example system that is consistent with some implementations of the present concepts.

In various organizations, IT administrators are typically tasked with deploying devices throughout the organization, and for ensuring that such devices are adequately configured with various settings that can ensure that the organization's network remains secure and stable. For example, an organization may require that any devices issued to employees of the organization be locked down such that the employees cannot install new applications or modify settings of the device. Alternatively, the organization may restrict installation of applications to the managed device, such that a user can only install certain trusted applications. However, the wide variety of devices that may be deployed by an organization can make management of these devices difficult, as each device may require different configuration values to ensure adherence to the organization's security requirements.

In certain instances, IT administrators can utilize an enterprise mobility management (EMM) service, which can provide a set of services and technologies that can assist with provisioning and securing an organization's devices. For example, an organization may deploy multiple devices, and upon powering on of the devices or periodically during the deployment life of the devices, the devices can interact with the EMM to receive necessary configuration data for provisioning. Such configuration data can include, for example, security policies, wireless passwords, required applications, and various administrator tools, among other settings. An EMM can typically provide some flexibility for the configuration of devices, as one organization that utilizes the EMM may have vastly different requirements than a different organization that utilizes the EMM. As such, the EMM can be used to assist with defining the various configuration settings to be applied to deployed devices associated with an organization.

However, even with the use of an EMM, an IT administrator may still need to provide several different configuration profiles based on the type of devices being deployed. For example, upon deploying a smartphone and a laptop to an employee, the configuration settings for the two devices may be very different, which may require that the IT administrator determine multiple sets of configuration settings to be used for configuring the devices. This can therefore result in a large amount of work in deploying various types of devices throughout the organization.

Furthermore, in certain instances, an organization may need to change from one EMM to a different EMM, such as when the organization is migrating between operating systems for the devices. Because each EMM utilizes different methods for managing devices, an IT administrator may often need to start over with the new EMM service by redefining the various configuration profiles associated with the different types of devices utilized by the organization. Moreover, each device may need to be formatted and re-provisioned in order to be operable with the new EMM service.

As such, concepts disclosed herein can provide technical solutions for enabling convenient deployment of devices by providing a platform management server that can serve as an intermediary between one or more EMMs and a variety of deployed devices. The platform management server can be utilized by users of an EMM to apply various configuration settings and resources on managed devices according to common configuration templates that can be utilized for all of the devices. The configuration templates can specify, by way of the EMM, various configurations to be applied to the devices, including security settings and installation requirements. Upon powering on of a deployed device, the device can check-in to the platform management server, which can include a discovery service that can assist the device in discovering whether the device should be managed by the platform management server, and what specific EMM should manage the device.

Once the device determines that it is to be managed by the platform management server, the platform management server can apply the particular configuration template provided by the EMM associated with the device. In certain implementations, the configuration templates can include one or more placeholders for additional configuration data values, such as secret passwords or other such sensitive data that the organization may not want shared or viewable by the platform management server. In such instances, the platform management server may issue a call back to the EMM to provide the secret values, which can be encrypted at the EMM and passed through to the device in an encrypted state, such that the specifics of the data are not discernable to the platform management server. Upon receiving the encrypted data, the device can decrypt the data and apply the secret values during configuration of the device.

The platform management server can additionally precompute the various configuration settings and applications specified by the configuration template in advance of the device checking in upon initial powering on of the device. For example, the platform management server can precompute that for certain smartphone devices utilized by the organization, certain applications on the smartphone may need to be removed prior to installing an application that may be preferred by the organization. Moreover, the platform management server can determine whether a template provided by an IT administrator has potentially conflicting requirements, and can resolve and report such conflicts to the administrator via the EMM.

It is to be appreciated that any reference herein to configuration data can include multiple types of data that can be used to configure a device, such as software applications, policy settings, passwords, pre-shared keys, single use secrets, tokens, unique identifiers, checksum values, a cryptographic nonce, or any other type of data that may be utilized in the configuration of a device for use in enabling the device to use a network. Such configuration data may be associated with a configuration packet that may be provided to a device by way of the platform management server, where the device can apply the various settings and applications associated with the configuration packet.

Example System

With reference to FIG. 1, an example system 100 for performing secure management of deployed devices in accordance with techniques disclosed herein is provided. As depicted in FIG. 1, system 100 can comprise a platform management server 102 that can be utilized to manage the provisioning of one or more managed device(s) 104, which may include desktop or laptop devices 104(1) or portable devices 104(2), for example. The management of managed devices 104 may be initiated by an administrator 106, who may interact with one or more enterprise service(s) 108 to define configuration templates to be used for provisioning managed devices 104, and can monitor the status of the provisioning process. Enterprise services 108 may be an EMM, and may include multiple different types of EMMs, such as EMM 108(1) which may be an EMM provided by a particular service provider, while EMM 108(2) may be an EMM provided by a different service provider. For example, enterprise services 108 may be any or all of Microsoft Intune®, AirWatch by VMware®, or MobileIron®, among other such EMM services.

Platform management server 102, managed devices 104, administrator 106, and enterprise services 108 may all be communicatively coupled by way of a network 110 (e.g., the Internet or an intranet). However, it is to be appreciated that while the various entities depicted in system 100 can be communicatively coupled to network 110, not all of the entities may necessarily communicate with each other. For example, in some implementations, administrator 106 may only communicate with enterprise service 108, and does not have the direct ability to communicate with platform management server 102. Similarly, enterprise service 108 may not have the ability to communicate directly with managed devices 104, as platform management server 102 can be in charge of communication with the managed devices.

Platform management server 102 and managed devices 104 may each comprise a processor 112 and memory 114. Memory 114 may have various software modules that can be executable by processor 112 for performing the processes disclosed herein. Memory 114 can include both persistent storage resources, such as magnetic or solid-state drives, and volatile storage, such as one or more random-access memory devices. In some cases, the modules described herein in connection with memory 114 can be provided as executable instructions that are stored on persistent storage devices, loaded into the random-access memory (RAM), and read from RAM by the processor for execution.

Memory 114(1) associated with platform management server 102 can include or have access to a management module 116, which may be a software program executable by processor 112 for performing the various management tasks associated with configuring managed devices 104. Memory 114(1) may also include an API 118 that can be exposed to provide programming interfaces for use by enterprise service 108, and a discovery module 120 and check-in module 122 that can interact with deployed devices.

In one implementation, enterprise service 108 may include a software application usable by administrator 106 that can include a graphical user interface (GUI) for displaying a visual depiction of managed devices within the organization, and present information to administrator 106 about the various options available for configuring the devices by way of templates that can be applied to the devices as provided by platform management server 102. In particular, the GUI of enterprise service 108 may interact with management module 116 by making programmatic calls using API 118 to pull certain information regarding configuration capabilities of management module 116, and to provide received template data in a form suitable for processing by management module 116. Such template data can be stored, for example, in a database 124 of platform management server 102.

In some implementations, management module 116 may allow only certain configuration data to be specified in the templates, regardless of the particular EMM that is utilizing platform management server 102 to manage the devices. By only providing API calls for particular types of information, platform management server 102 can ensure that configuration settings applied by administrator 106 via enterprise service 108 do not go outside the bounds of the predefined templates. For example, while the template utilized by platform management server 102 can include a large listing of various data fields, an EMM would not be able to specify additional secret values beyond the templatized fields in the template. This can ensure that management module 116 can appropriately precompute a configuration packet for managed devices 104 without running into problems of how to handle unknown data, which could result in system instability.

In providing enterprise service 108 the ability to define configuration data for use by multiple types of managed devices 104, management module 116 may abstract out the details of how the configuration can be applied to each of the managed devices, as the management module can ultimately precompute the necessary device-specific configuration steps once the device checks-in, regardless of what kind of device it is. As such, an administrator 106 can provide generic configuration data via enterprise service 108 by filling in any relevant data that is specified by the configuration template without regard to device implementation, along with an assignment of the data to a particular device. The assignment of templates to particular devices can utilize a flexible assignment system that can easily allow administrator 106 to specify certain devices among the organization's various deployed devices. The flexible assignment system can, for example, provide a sorting functionality where devices that are all associated with a particular group within the organization can be targeted, such as a marketing group, and is described in further detail below regarding FIG. 2.

FIG. 2 depicts an example graphical user interface (GUI) 200 of an assignment system that may be displayed to administrator 106 for assigning configuration templates to certain deployed devices. FIG. 2 depicts an example GUI 200, wherein the GUI 200 can be presented to administrator 106 by way of enterprise service 108. Example GUI 200 depicts an administrative page whereby administrator 106 can search for particular managed devices or groups of devices, and can apply configuration templates to the devices. GUI 200 can also provide administrator 106 with information regarding the application of the templates on the device.

Specifically, GUI 200 depicts an example user interface that can be used by administrator 106 to create, search, sort, or filter various managed devices that may be deployed. GUI 200 may interact with database 124 in order to extract relevant information that may be displayed, and upon receiving of data from administrator 106, may update database 124 to reflect the changes made by the administrator. GUI 200 may comprise various menu options, including a new device button 202, which can allow administrator 106 to define a new device or grouping of devices, and the device or group data can be stored in database 124 of platform management server 102. In one implementation, devices can be identified based on a serial number of a device, or other such identifying characteristics. GUI 200 can further include a template view button 204, which can display a listing of templates currently stored within database 124, allowing for the addition, deletion, or modification of templates that can be associated with devices.

GUI 200 may also include numerous flexible ways to select particular devices and assign templates to the devices. For example, GUI 200 may include a search field 206, allowing a developer to insert a query for a particular device, and existing devices that may be known within database 124 can be searched based upon the received query. The search field 206 can be particularly useful when devices can be associated with individual users or groups already in existence, thereby allowing administrator 106 to relatively quickly identify managed devices of interest. GUI 200 can further include a user filter field 208, a group filter field 210, and a type filter field 212, which allows for existing devices to be filtered based upon various inputs, such as a particular user's name, a group name within an organization associated with administrator 106, or types of devices within the organization, such as a smartphone or laptop device. Such fields can be text entry fields, pull-down menus, or the like.

GUI 200 can further include a field 214 that includes several rows for existing managed devices, wherein each row may correspond to a respective device or group of devices. Each device can have an associated description (which may specify the user and/or group names), a template associated with the specific device or group (which may be modified by way of a pull-down menu that may be populated from database 124), a state of the device with respect to the template, and a record of the last report received from the device or a device in a group.

The various device descriptions displayed in field 214 may be individually selectable by administrator 106. Upon selection of a description, a user interface can be generated that displays information associated with the selected device or group depicting the specific dialog flow associated with the selected training dialog. For example, a graphical user interface may be depicted that displays current hardware associated with a device, along with options to modify the enrollment of the device in the managed network associated with the organization. It is to be understood that the information in the rows is set forth to assist administrator 106 in differentiating between various managed devices and determining their appropriate states in view of applied templates, but the information depicted in FIG. 2 is not intended to reflect the only information that may be presented, and that any suitable type of information that can assist administrator 106 in administering devices is contemplated.

Referring again to FIG. 1, upon receiving the configuration templates and device assignments, such as by way of GUI 200, management module 116 can store the configuration templates and any associated assignments into database 124, and can also precompute a variety of installation parameters that can be provided to managed device 104 in order to apply the settings that are specified in the configuration templates. Furthermore, the installation parameters can be prioritized in such a manner as to ensure that the installation of certain configuration data does not cause a conflict with other data on the device. For example, upon check-in of managed device 104, management module 116 can determine the appropriate template to be applied to the device, and because management module 116 already precomputed the installation parameters for the device when the configuration template was first received from administrator 106, the installation parameters can be immediately provided to managed device 104 without having to wait for an on-the-fly computation by management module 116 to discover the necessary parameters.

Discovery module 120 can be used to handle initial discovery tasks associated with managed device 104. In certain implementations, managed device 104 may be recently deployed to a location or user, and upon powering on of the device, the device may be preconfigured to access discovery module 120 in order to allow the device to determine what EMM should be authenticating and managing the configuration of the device. Once discovery module 120 determines the appropriate EMM that the managed device should be associated with, the managed device can be provided with a certificate to be used upon checking-in of the device, which can assist with defining the particular template to be used with the device. Having received a particular certificate for checking in, managed device 104 can then interact with check-in module 122, where platform management server 102 can begin the process of determining a current state of the device.

Figure 3:
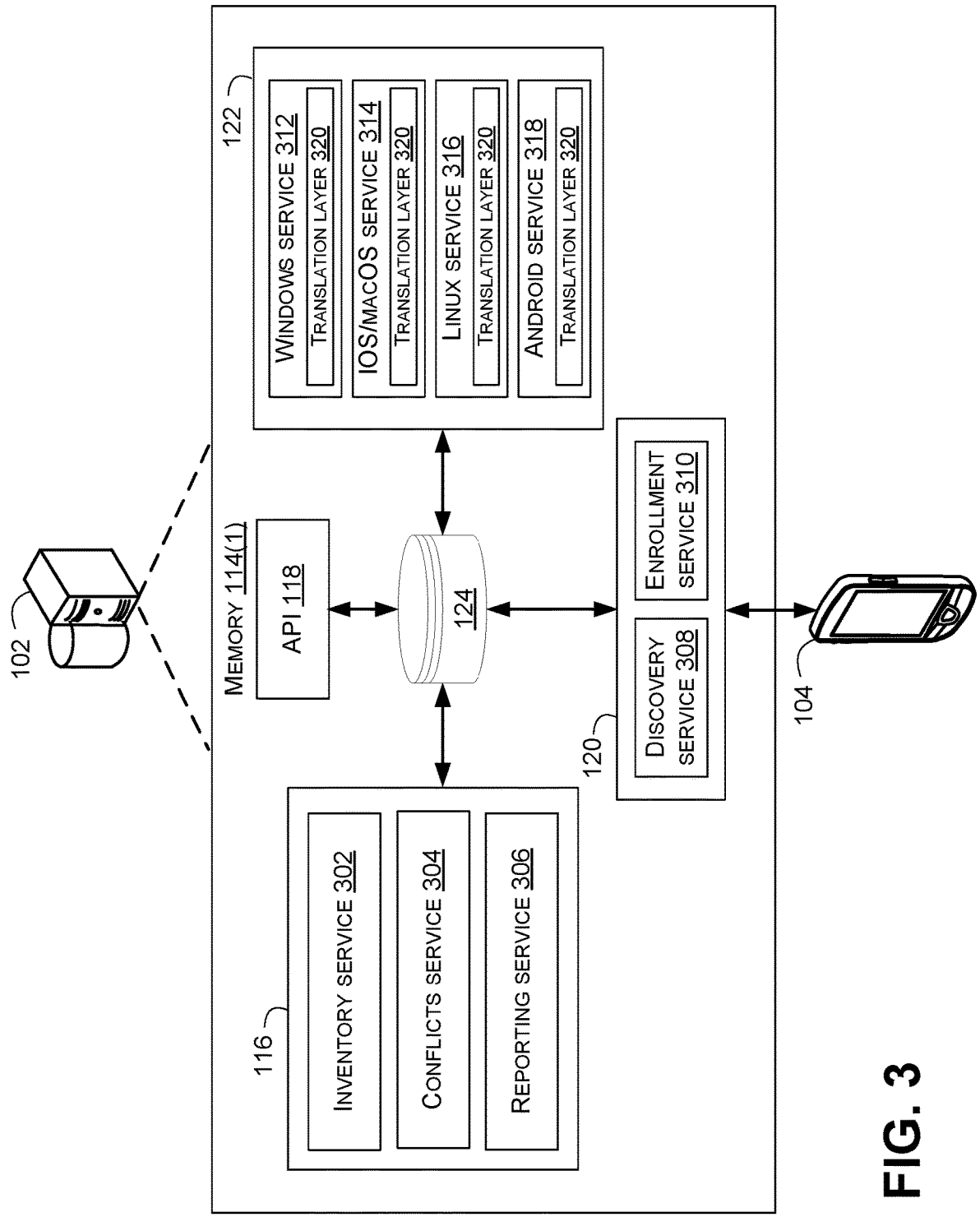
FIG. 3 illustrates an example system that is consistent with some implementations of the present concepts.

FIG. 3 depicts memory 114(1) associated with platform management server 102 and the various modules in greater detail. As referenced above, management module 116 can precompute a variety of installation parameters that can be provided to managed device 104 in order to apply the settings that are specified in the configuration templates. In one implementation, the precomputation of the installation parameters may be performed in combination with an inventory service 302, which may include references to various software inventories that may be included as part of the configuration of managed device 104 in accordance with the configuration template. Inventory service 302 may further have records that specify a default configuration for a particular device, and as such, management module 116 can reference these records in order to determine whether certain software may be typically installed on these devices, and should be removed from the device in accordance with configurations provided by administrator 106.

For example, a deployed device may automatically be imaged with a certain web browser once the device is shipped from an original equipment manufacturer (OEM), and administrator 106 may desire that the web browser be uninstalled, such as due to potential security risks. In this instance, inventory service 302 may have records that may indicate whether devices shipped from the OEM are pre-configured with the web browser, and management module 116 can therefore include a step of uninstalling the web browser. In another implementation, inventory service 302 may determine appropriate versions of certain software that should be associated with particular managed devices. For example, while a new operating system may be available for various managed devices, administrator 106 may desire that certain devices retain an older version of the operating system for compatibility purposes. As such, inventory service 302 can return the appropriate software version for a device when requested.

Management module 116 can also include a conflicts service 304, which can assist in prioritizing installation parameters associated with the configuration of a managed device. Conflicts service 304 may prioritized the installation of certain software or the application of configuration settings in such a manner as to ensure that the installation of certain configuration data does not cause a conflict with other data on the device, and can ensure that any dependencies are met prior to installation. For example, installation of a certain software application may require certain configuration settings to be present on managed device 104, and as such, conflicts service 304 may determine that the configuration settings should be applied prior to installation of the software. Alternatively, conflicts service 304 may determine that a template received for a device may specify the installation of a certain software application, while the template may also later indicate that the software application should be uninstalled. In this instance, conflicts service 304 may resolve the conflict, and provide information regarding the resolution of the conflict.

In some implementations, the conflicts resolution information may be provided to a reporting service 306, which may generate information for an administrator 106 regarding the status of the provisioning of managed device 104. Specifically, reporting service 306 may provide detailed information about each step of the provisioning process and whether certain installation steps succeeded or failed. Reporting service 306 can further generate a summary report once provisioning of managed device 104 is completed, and the summary report may be provided to administrator 106 by way of management module 116.

In some implementations, discovery module 120 can include a discovery service 308 and an enrollment service 310. Upon checking in of a new device, platform management server 102 may discover which, if any, EMM should manage the device. Therefore, as discussed previously, upon powering on of the device, the device may be preconfigured to access discovery service 308 in order to allow the device to determine whether the device should be associated with an EMM, and which specific EMM to conduct enrollment with. Discovery service 308 can interact with database 124 in order to determine whether the database contains information designating the device as one to be managed by platform management server 102. Furthermore, database 124 may contain data regarding the specific EMM that can manage the device. Upon determining that the device is to be managed by platform management server 102, and upon determining the appropriate EMM that the managed device should be associated with, enrollment service 310 can interact with database 124 in order to issue an appropriate certificate to be used for checking-in of the device, which can assist with defining the particular template to be used with the device.

Upon receipt of the certificate, managed device 104 can perform a check-in process by way of check-in module 122, which can determine what configuration data is currently local to the device, and what configuration data is supposed to be located on the device according to the configuration template. Check-in module 122 may include various OS and/or device specific services that can enable proper configuration of managed devices of varying configurations. For example, check-in module 122 may include a Windows service 312, an iOS/macOS service 314, a Linux service 316, and an Android service 318, and each of these serves may utilize a translation layer 320 during operation.

These services may include specific installation parameters that may be necessary for proper provisioning of managed devices, depending on their operating system configuration, and translation layer 320 associated with each of the services can appropriately translate generic instructions to the specific provisioning commands that may be necessary for the different types of managed devices and/or operating systems on the devices. However, it is to be appreciated that additional services may be utilized as part of check-in module 122, such as services for different hardware that may be on the managed devices (e.g., ARM-based instruction sets, x86 instruction sets, etc.). Once check-in module 122 determines the differences between the current state of the device and the desired configuration set forth in the configuration template, a configuration packet can be provided to the managed device that can include the configuration template, and the data that may be necessary to achieve a device state that is defined by the configuration template. A more detailed description of the check-in process is described in more detail below with respect to FIG. 4.

Referring once again to FIG. 1, upon issuance of the configuration packet to managed device 104, the configuration packet can be stored in a persistent storage area 126 associated with managed device 104. Persistent storage area 126 may also store an image of the initial factory settings state for the device, which may serve as a backup for performing a clean installation of an operating system on the device, should the provisioning of the device experience difficulties.

An orchestrator module 128 can then handle unpacking and applying of the configuration data provided in the configuration packet. In some implementations, the configuration packet may contain one or more references to external templates, and orchestrator module 128 can coordinate the communication back to platform management server 102 in order to download the external templates.

Moreover, based upon instructions contained in the configuration packet from platform management server 102, or alternatively on its own accord, orchestrator module 128 can further perform periodic state determinations regarding the current configuration state of managed device 104. That is, because the configuration packet was received and stored in persistent storage area 126, orchestrator module 128 can periodically determine whether the current configuration state of the device matches the configuration requirements specified in the configuration template. Thus, orchestrator module 128 can maintain a given configuration on a managed device on its own, even if managed device 104 is not currently connected to network 110.

Example Process for Device Check-in

Figure 4:
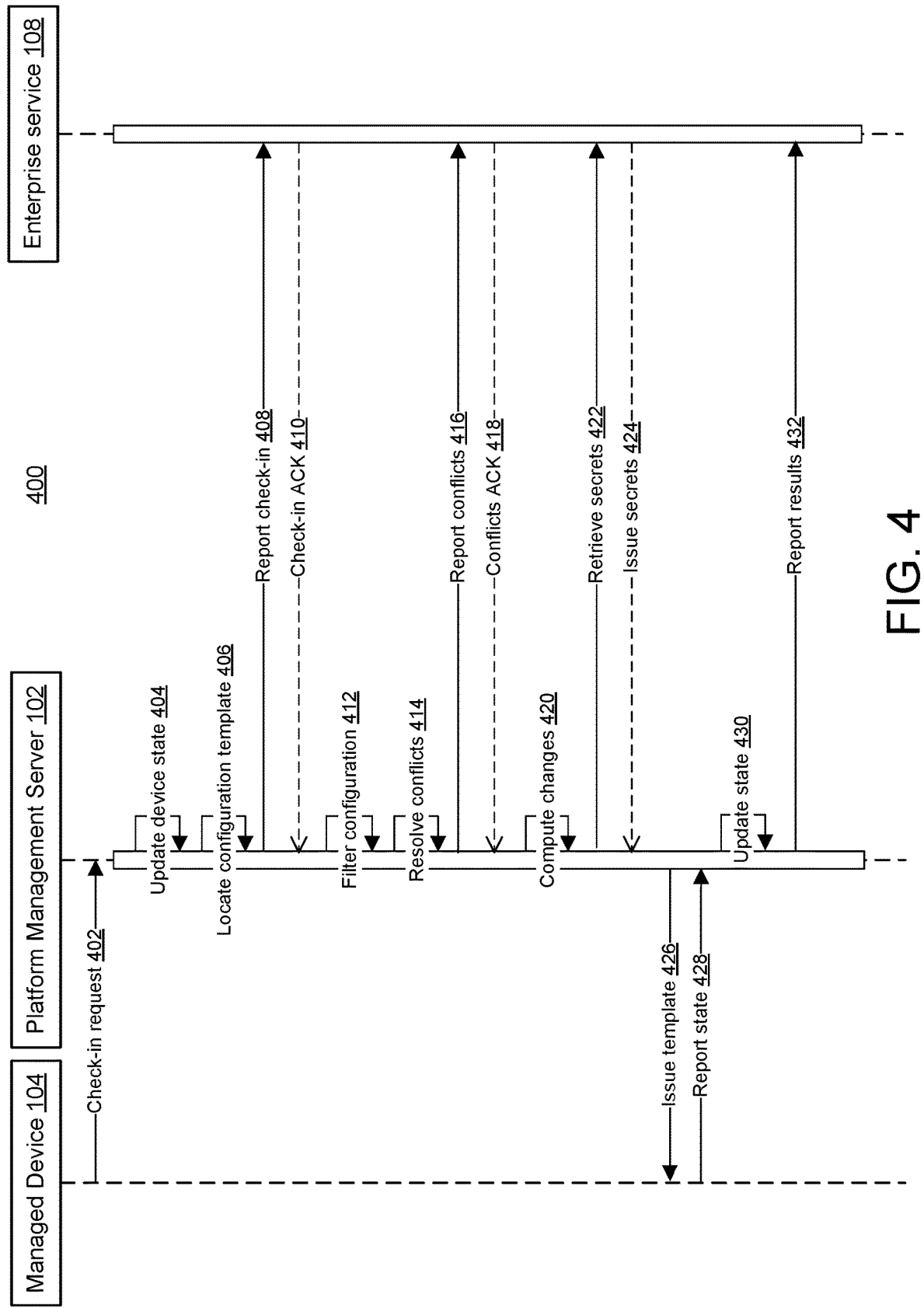
FIG. 4 illustrates an example process flow that is consistent with some implementations of the present concepts.

FIG. 4 depicts an example process 400 for a managed device 104 to check-in and receive a configuration template from platform management server 102, in accordance with one implementation. As depicted in FIG. 4, managed device 104 may issue a request to check-in to platform management server 102 at step 402. As discussed earlier, managed device 104 may be initially configured to issue a check-in request to platform management server 102 upon initial powering on of the device. However, in some implementations, older devices that may have been previously deployed may not include the configuration data necessary for the device to check-in to platform management server 102, and instead may issue a request to an identity manager. In such a case, the identity manager could be configured to either redirect the request to platform management server 102, or provide an update to the device that instructs it to communicate with platform management server 102 in the future.

The check-in request from managed device 104 may include device information detailing the existing state of the device, such as by including information on the hardware included with the device, an operating system version, document/application lists, and a token indicating a user or group identity associated with the device. Because a managed device may check in multiple times over the course of its deployment, the device information can also include information regarding the version of templates applied on the device, and the status of any of the applied templates (e.g., template applied successfully, template resulted in error, etc.). The device information may be gathered by way of orchestrator module 128, and provided during check-in.

Upon receiving the device information included with the check-in request, at step 404, platform management server 102 may update the current client state stored in database 124. Based at least on the current client state, platform management server 102 can further determine whether certain actions may be performed for the managed device. For example, if the current client state indicates that the managed device has not checked in previously, an additional introductory template may be provided to the device that can display some introductory messages for a user of the device. Alternatively, if an administrator 106 has indicated that a particular device should be unenrolled by way of enterprise service 108, then certain check-in steps can be skipped.

Furthermore, at step 406, management module 116 can utilize the device information contained in the check-in request to access database 124 in order to locate a configuration template for the device. For example, management module 116 can access a token contained within the device information that specifies a particular user or group identity associated with the device, and coupled with the hardware information provided in the request, can access database 124 in order to determine whether a configuration template has been defined and stored by enterprise service 108 that is to be targeted to that specific user and device. Upon determining that a configuration template exists in the database, management module 116 can extract the template and the precomputed installation parameters associated with the template.

At step 408, platform management server 102 may provide a notification to enterprise service 108 in order to alert administrator 106 that a check-in request has been received from a managed device. Such a notification can be generated by reporting service 306. Furthermore, the notification can also indicate the user and device combination associated with the request, and can indicate the configuration template that platform management server 102 intends to apply to the managed device. In certain implementations, administrator 106 may have the ability to cancel the application of the template to the device, or may be able to supplement the provisioning process by refining the template at this stage.

For example, an administrator 106 may have defined a configuration template for the managed device in the past, and may be in the process of modifying an application set that should be installed on the managed device. In this instance, administrator 106 may modify the configuration template, or may allow the configuration template to be applied to managed device 104, but can be informed that this particular managed device may need a configuration template update.

At step 410, administrator 106 can optionally acknowledge the check-in and provide any immediate response regarding the notification to platform management server 102, such as by indicating that the selected configuration template should not be applied to managed device 104. In certain implementations, step 410 may be optional, as platform management server 102 may default to automatically proceeding with applying the selected configuration template absent any incoming response from enterprise service 108.

At step 412, management module 116 can filter certain configuration settings, such as by determining whether the configuration template associated with managed device 104 may include certain configurations that are not applicable to the specific targeted device. For example, while a configuration template may be defined for all users of smartphones within a marketing group in an organization, there may be different operating systems running on the smartphones. As such, certain settings specified in the configuration template may be applicable only to smartphones that have an operating system above a certain version. In this case, management module 116 can determine whether any of the precomputed configuration settings for the device can be filtered out. As such, management module 116 can on-the-fly modify the configuration to be applied to the device as the state of the device changes over time.

Next, at step 414, management module 116 can resolve any conflicts presented by the configuration template. Because management module 116 can precompute the various configuration settings based on the configuration template that was received by enterprise service 108, management module 116 can know what the device configuration should be based on a primary user associated with the device, and ensure that conflicting information between the device configuration and the user's specific configuration are resolved.

Specifically, in some instances, managed device 104 may issue a check-in request to platform management server 102, but the primary user associated with the managed device may not have logged into the device. In this instance, the configuration associated with the device can potentially deviate from the configuration associated with the user. For example, administrator 106 may issue a default configuration template to every laptop associated with an organization that indicates that a certain application should be removed. However, administrator 106 may also provide a configuration template specific to a user of one of the laptops that allows the application to stay installed, as the user's job requirements may involve that application. In this instance, because the primary user of the device was not logged in, the device would not be capable of reporting the user associated with the device in the check-in request, and the application may end up removed from the managed device when the configuration template is applied.

Instead, because management module 116 can precompute configuration settings in advance, management module 116 can determine that a primary user's configuration should be applied to the device, irrespective of whether the primary user is logged into the device. As such, management module 116 can avoid having the device state flip due to receiving limited information from the device (i.e., when user identity information is not provided in the check-in request).

At step 416, platform management server 102 can communicate any conflicts that may have been discovered during step 414 to enterprise service 108, presenting the conflict and a potential resolution to the conflict. In some implementations, the notification can indicate that the potential resolution may be applied as a default, and that administrator 106 need not take any action to resolve the conflict. Alternatively, at step 418, administrator 106 may acknowledge the conflict by issuing a resolution action via enterprise service 108.

At step 420, management module 116 can compute the changes that may be necessary in order for managed device 104 to achieve the state specified in the configuration template. The changes computation can be based on what the device reported in the initial check-in request, and the state can be compared to the configuration template stored in database 124. In certain implementations, management module 116 has filtered any nonapplicable configurations and resolved any conflicts, in accordance with steps 412 and 414.

Specifically, management module 116 can associate configurations into one of three possible categories: 1) configurations to add, 2) configurations to remove, and 3) configurations that are unassigned or unapplicable, but not removed from the managed device. The third category can be used if management module 116 determines that managed device 104 contains certain configurations that are not specified in the configuration template, but also determines that these settings do not conflict or interfere with any other settings on the device. For example, managed device 104 may include a wireless password for a home network associated with the primary user of the device, which may not be provided for in the configuration template. However, as removing this wireless password could affect the use of the device, management module 116 can specify that the wireless password should not be removed during application of the configuration template. Moreover, in certain implementations, if a configuration falls into the third category (i.e., an unassigned/unapplicable configuration), that configuration can potentially become applicable to the device in the future. However, as the configuration remained on the device, the device does not have to retrieve a new template from platform management server 102 in order to apply the desired configurations.

At step 422, management module 116 can issue a request to enterprise service 108 to retrieve secret values due to the existence of placeholders in the configuration template. As noted earlier, there may be certain information that administrator 106 may desire to keep secret, and as such, can define placeholders in the configuration template provided to platform management server 102. As such, management module 116 can coordinate the passing of secret information from enterprise service 108 to managed device 104.

At step 424, enterprise service 108 can issue the requested secret values to platform management server 102. In some implementations, the secret values issued from enterprise service 108 can be encrypted in order to protect the confidentiality of the secret values. The encrypted secret values can be provided to platform management server 102 for packaging with the configuration template that may be provided to managed device 104. The encrypted secret values can then be decrypted by managed device 104 once the configuration template is applied, thereby protecting the secret values from becoming known to platform management server 102.

At step 426, management module 116 can coordinate the issuance of a finalized configuration template, including any encrypted secret values, to managed device 104 as a configuration packet. Managed device 104 can then apply the configuration template, and decrypt any included encrypted secret values in order to complete provisioning of the device. Management module 116 can send the configuration template along with any necessary files and documents directly to managed device 104, or in some implementations, may upload the configuration packet to a server, and can provide a download link to managed device 104 where the configuration packet can be located.

At step 428, managed device 104 may report its current state based on applying the configuration template, including any errors that may have occurred during provisioning of the device. At step 430, management module 116 can store the current device state into database 124.

Finally, at step 432, management module 116 can issue a summary report to enterprise service 108 indicating the results of the provisioning of managed device 104, so that administrator 106 can make any necessary changes. The report may include information such as what configurations were applied to the device, any conflicts that were found and resolved, and configurations that failed during provisioning.

It is to be appreciated that alternative or additional steps may be provided beyond those specified in FIG. 4. For example, if management module 116 determines that a configuration template does not yet exist for a device that has checked in, a request for a configuration template may be issued to enterprise service 108 in order to provide the relevant information.

Example Device Management Method

Figure 5:
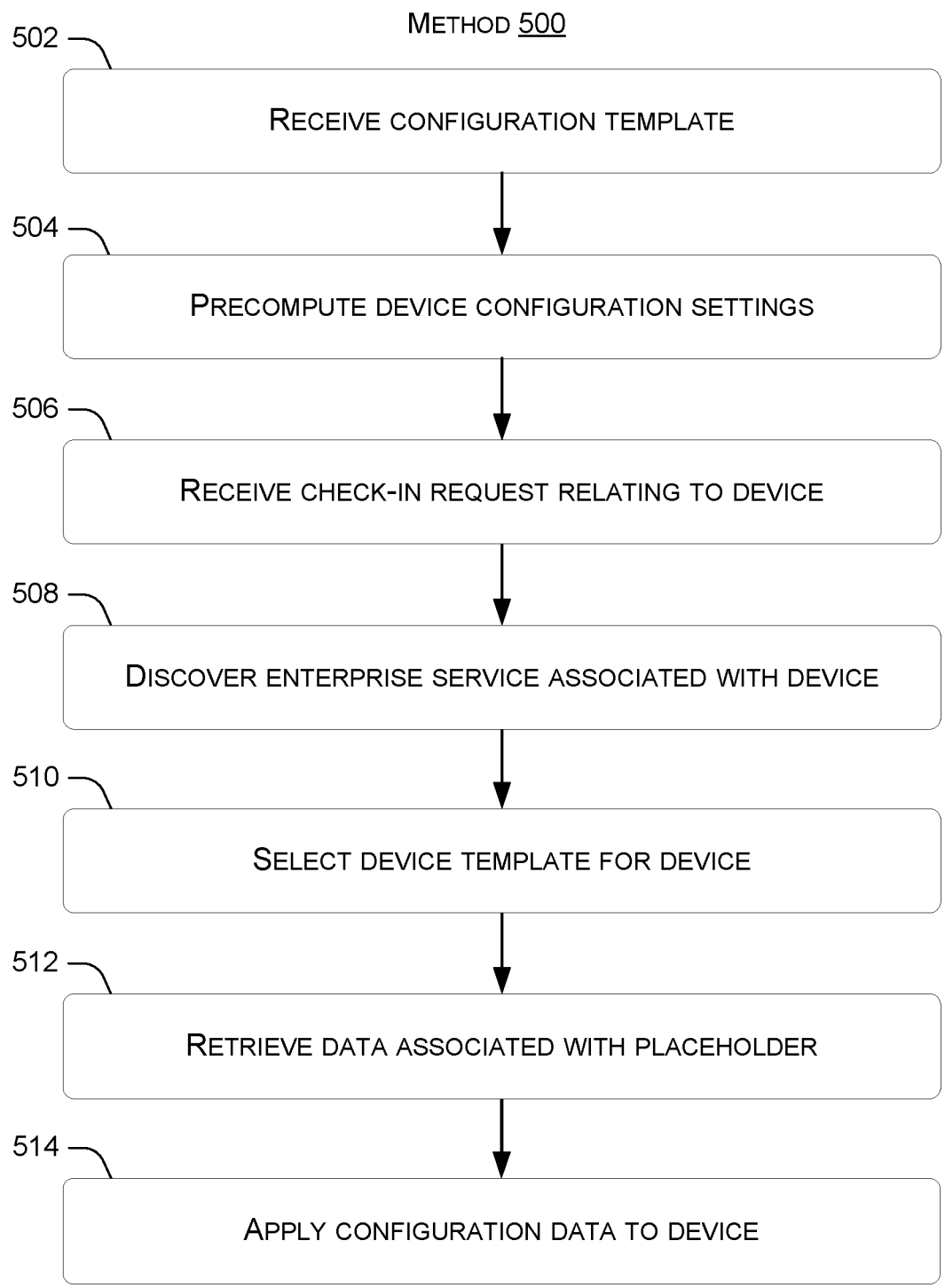
FIG. 5 illustrates an example method or technique that is consistent with some implementations of the present concepts.

The following discussion presents an overview of functionality that can provide management functionality as described above. FIG. 5 illustrates an example method 500, consistent with the present concepts. Method 500 can be implemented by a single device, e.g., platform management server 102, or can be distributed over one or more servers, client devices, etc. Moreover, method 500 can be performed by one or more modules, such as management module 116, discovery module 120, check-in module 122, and/or orchestrator module 128.

Initially, at block 502, the method may receive a configuration template. In one implementation, administrator 106 may utilize enterprise server 108 to provide a configuration template for manage device 104. The configuration template can be received by platform management server 102 and stored within database 124. The configuration template may be associated with a particular class of deployed devices, and in some instances, may be associated with particular users of certain deployed devices.

At block 504, the method may precompute device configuration settings based at least on the configuration template. In one implementation, management module 116 can analyze the configuration template to determine what generic configuration settings are provided in the template. Then, management module 116 can determine device-specific configuration settings based on the targeted device, enabling the generic configuration to be translated into device-specific settings that are applicable to the device that is targeted by the configuration template. Once management module 116 precomputes the various configuration settings, these settings can be stored in database 124 for access once a device checks in to the platform management server.

At block 506, a check-in request can be received from a managed device. For example, managed device 104 may be newly powered on at a deployment location, and can be configured to issue a check-in request to platform management server 102 upon initial booting.

At block 508, the method can discover an enterprise service that is associated with managed device 104. In one implementation, platform management server 102 can be associated with a plurality of enterprise services, but platform management server 102 can discover that managed device 104 is to be managed by a single enterprise service, and can therefore prevent other enterprise services from communicating with the managed device, which can ensure that the managed device is not managed by a malicious endpoint.

At block 510, the method can select a device template associated with the discovered enterprise service and which corresponds to the managed device. In one implementation, platform management server 102 can select an appropriate device template. The device template can be stored, for example, in database 124, and management module 116 can extract the relevant device template from the database based on device information provided in the check-in request, and information concerning the enterprise service that manages the device. As noted above, in some implementations, the device template may contain placeholders, which can be used to specify secret values that are to be used for configuring the device. As platform management server 102 does not have the secret values, they can be provided by the enterprise service associated with the managed device.

As such, at block 512, the method can retrieve the additional configuration data associated with the placeholder from the enterprise service. Specifically, platform management server 102 may indicate to enterprise service 108 that there are placeholders in the template that require secret values. Enterprise service 108 can encrypt the secret values and provide the encrypted data back to platform management server 102 for passthrough to managed device 104. As platform management server 102 cannot decrypt the encrypted data, the secret values can remain secret even though the data is passed through platform management server 102.

Finally, at block 514, the method can apply the configuration issue network settings to the managed device. Specifically, management module 116 can prepare a configuration packet for transmitting to managed device 104 with instructions to apply the configurations specified in the packet. Orchestrator module 128 may coordinate unpackaging the configuration packet and proper provisioning of the managed device, including decrypting the encrypted data provided by enterprise service 108 in order to apply the secret values. In some implementations, the configurations set forth in the configuration packet may include network settings, provisioning settings and/or software that should be associated with the managed device.

Device Implementations

As noted above with respect to FIG. 1, system 100 may include several devices, including a platform management server 102, managed devices 104, and enterprise services 108. As also noted, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 114 can be storage resources that are internal or external to any respective devices with which it is associated. Memory 114 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 114.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices, such as IoT devices, that communicate over one or more network(s). Without limitation, such one or more network(s) can include one or more local area networks (LANs), wide area networks (WANs), the Internet, and the like.

Various examples are described above. Additional examples are described below. One example includes a management server comprising a processor and a computer-readable storage media storing instructions that, when executed by the processor, cause the management server to configure a managed device by: receiving a configuration template associated with the managed device, the configuration template including placeholders for additional configuration data, receiving a check-in request from the managed device, determining an enterprise service associated with the managed device based at least on the check-in request, requesting the additional configuration data from the enterprise service associated with the managed device, and applying the configuration template, including the additional configuration data, to the managed device.

Another example can include any of the above and/or below examples where the management serve further comprises receiving, from the enterprise service, the additional configuration data.

Another example can include any of the above and/or below examples where the additional configuration data received from the enterprise service is encrypted.

Another example can include any of the above and/or below examples where the additional configuration data is decrypted when applied to the managed device.

Another example can include any of the above and/or below examples where the management server further comprises precomputing configuration settings according to the configuration template for the managed device prior to receiving the check-in request.

Another example can include any of the above and/or below examples where the configuration template defines configuration data generically without regard to device implementation.

Another example can include any of the above and/or below examples where the precomputed configuration settings include device-specific configuration settings.

Another example can include any of the above and/or below examples where the check-in request indicates a current state of the managed device.

Another example can include any of the above and/or below examples where the management server further comprises computing changes between the current state of the managed device and a state defined by the configuration template.

Another example can include any of the above and/or below examples where the current state of the managed device is compared to the state defined by the configuration template periodically.

Another example can include any of the above and/or below examples where the enterprise service is determined from among a plurality of enterprise services.

Another example includes a method comprising receiving a check-in request relating to a device, discovering an enterprise service associated with the device, selecting a device template associated with the enterprise service that is to be applied to the device, the device template containing a placeholder for a secret value, retrieving data associated with the placeholder from the enterprise service, and applying configuration data associated with the device template to the device, the configuration data including the data associated with the secret value.

Another example can include any of the above and/or below examples where the data associated with the secret value is encrypted.

Another example can include any of the above and/or below examples where the data associated with the secret value is decrypted by the device.

Another example can include any of the above and/or below examples where the check-in request includes a device state of the device.

Another example can include any of the above and/or below examples where the method further comprises periodically comparing the device state to the device template and updating the device to match the device template when the device state is different from the device template.

Another example can include any of the above and/or below examples where the method further comprises instructing the device to compare the device state periodically to the device template when the device is not connected to a network.

Another example can include any of the above and/or below examples where the device state is periodically compared to the device template irrespective of a user that is logged into the device.

Another example includes a system comprising a processor and a memory storing computer-readable instructions that when executed by the processor, cause the platform management server to: receive a check-in request from a device, determine, based at least on data in the check-in request, an enterprise service, from among a plurality of enterprise services, which is configured to manage configuration of the device, and receive, from the enterprise service, a configuration template containing configuration data and at least one placeholder indicative of a secret value to be retrieved from the enterprise service upon applying of the template to the device.

Another example can include any of the above and/or below examples where the configuration data received from the enterprise service is generic configuration data, and the platform management server precomputes device-specific configuration settings that correspond to the device.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A management server comprising:
a processor; and
a computer-readable storage media storing instructions that, when executed by the processor, cause the management server to configure a particular managed device by:
receiving a configuration template associated with the particular managed device, the configuration template including configuration data for a plurality of managed devices and placeholders for additional secret configuration data;

receiving a check-in request from the particular managed device;
based at least on the check-in request, determining a particular enterprise service associated with the particular managed device, the particular enterprise service being accessible to the management server over a computer network;
requesting the additional secret configuration data over the computer network from the particular enterprise service associated with the particular managed device; and
applying the configuration template, including the configuration data in the configuration template and the additional secret configuration data received from the particular enterprise service, to the particular managed device.

2. The management server of claim 1, wherein the instructions, when executed by the processor, cause the management server to configure the particular managed device by:
receiving, from the particular enterprise service, the additional secret configuration data.

3. The management server of claim 2, wherein the additional secret configuration data received from the particular enterprise service is encrypted.

4. The management server of claim 3, wherein the additional secret configuration data is decrypted by the particular managed device and cannot be decrypted by the management server.

5. The management server of claim 1, wherein the instructions, when executed by the processor, cause the management server to configure the particular managed device by:
precomputing configuration settings according to the configuration template for the particular managed device prior to receiving the check-in request.

6. The management server of claim 5, wherein the configuration template defines the configuration data for the plurality of managed devices generically without regard to device implementation and the additional secret configuration data is device-specific for the particular managed device.

7. The management server of claim 6, wherein the precomputed configuration settings include device-specific configuration settings for the particular managed device.

8. The management server of claim 1, wherein the check-in request indicates a current state of the particular managed device.

9. The management server of claim 8, wherein the instructions, when executed by the processor, cause the management server to configure the particular managed device by:
computing changes between the current state of the particular managed device and a state defined by the configuration template.

10. The management server of claim 9, wherein the instructions, when executed by the processor, cause the management server to configure the particular managed device by:
periodically comparing the current state of the particular managed device to the state defined by the configuration template.

11. The management server of claim 1, wherein the instructions, when executed by the processor, cause the management server to configure another managed device by:
receiving another check-in request from another managed device; and
applying, to the another managed device, the same configuration data applied to the particular managed device and different additional secret configuration data received from the particular enterprise service.

12. A method comprising:
receiving a check-in request relating to a device;
discovering an enterprise service associated with the device;
selecting a device template associated with the enterprise service that is to be applied to the device, the device template containing a placeholder for a secret value that is specific to the device;
retrieving the secret value from the enterprise service; and
applying configuration data associated with the device template to the device, the configuration data including the secret value that is specific to the device as well as other data that is applicable to other devices associated with the enterprise service.

13. The method of claim 12, wherein the secret value is encrypted.

14. The method of claim 13, performed by another device that cannot decrypt the secret value.

15. The method of claim 12, wherein the check-in request includes a device state of the device.

16. The method of claim 15, further comprising:
periodically comparing the device state to the device template; and
updating the device to match the device template when the device state is different from the device template.

17. The method of claim 16, further comprising:
instructing the device to compare the device state periodically to the device template when the device is not connected to a network.

18. The method of claim 16, wherein the device state is periodically compared to the device template irrespective of a user that is logged into the device.

19. A system comprising:
a platform management server comprising a processor and a memory storing computer-readable instructions that, when executed by the processor, cause the platform management server to:
receive a check-in request from a device;
determine, based at least on data in the check-in request, an enterprise service, from among a plurality of enterprise services, which is configured to manage configuration of the device;
receive, from the enterprise service, a configuration template containing configuration data applicable to multiple devices managed by the enterprise service and at least one placeholder or a secret value that is specific to the device; and
apply, to the device, the configuration data that is applicable to the multiple devices managed by the enterprise service and the secret value that is specific to the device.

20. The system of claim 19, wherein the computer-readable instructions, when executed by the processor, cause the platform management server to:
precompute, from the configuration data, device-specific configuration settings that correspond to the device and apply the device-specific configuration settings to the device.

* * * * *